H. L. INGERSOLL.
GOVERNOR CONTROL FOR BOOSTER MOTORS FOR LOCOMOTIVES.
APPLICATION FILED OCT. 20, 1919.

1,339,513.

Patented May 11, 1920.

Inventor
Howard L. Ingersoll

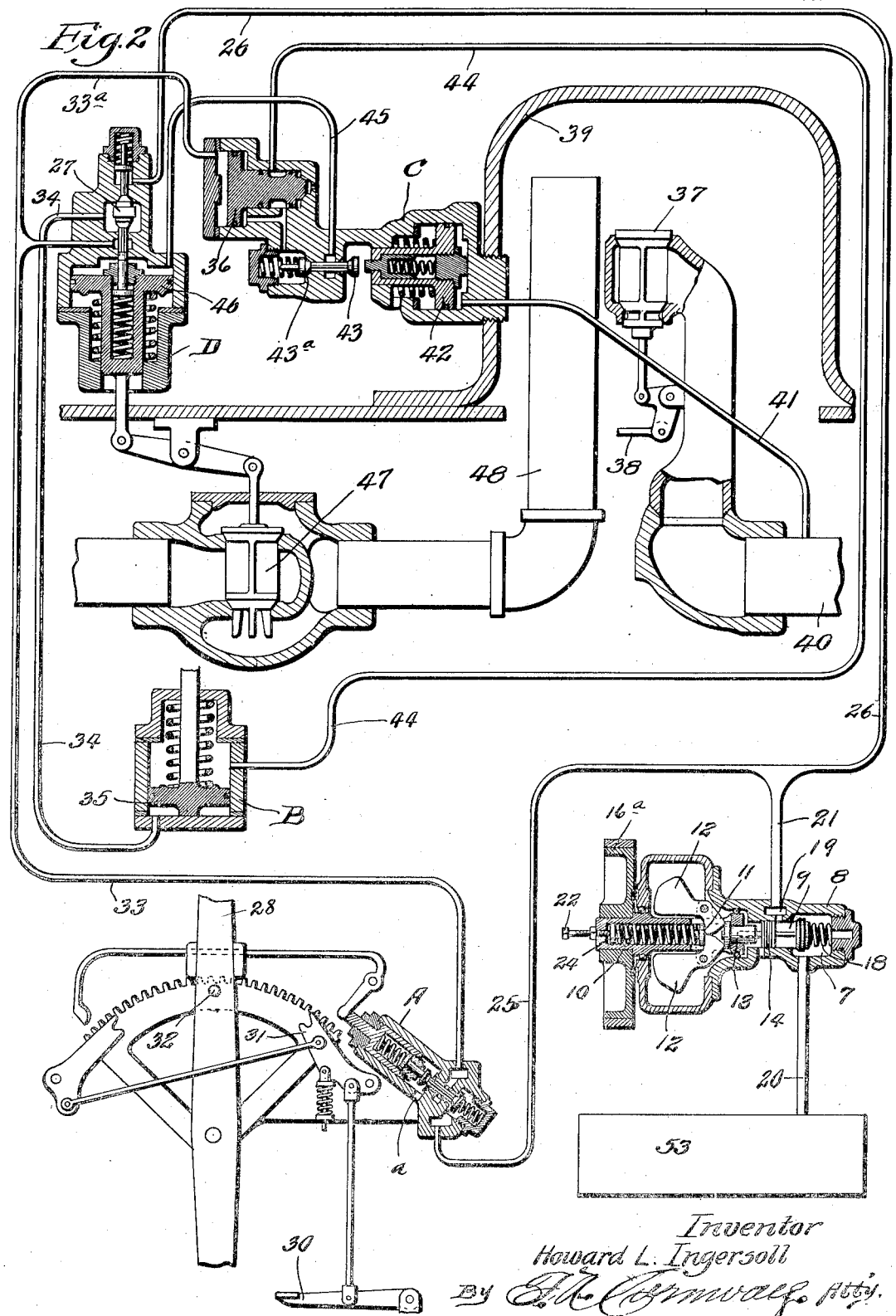

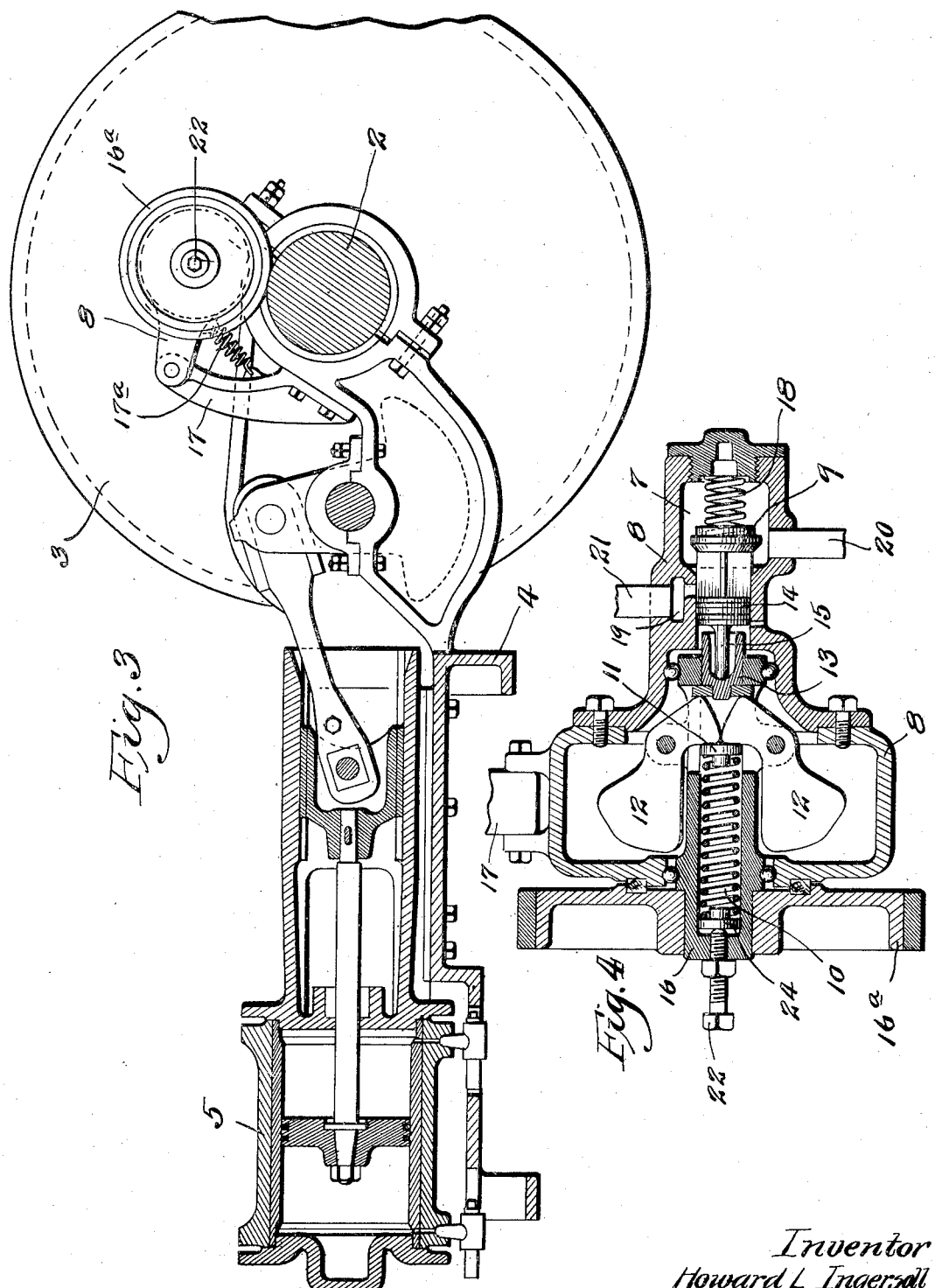

UNITED STATES PATENT OFFICE.

HOWARD L. INGERSOLL, OF WHITE PLAINS, NEW YORK.

GOVERNOR CONTROL FOR BOOSTER-MOTORS FOR LOCOMOTIVES.

1,339,513.  Specification of Letters Patent.  Patented May 11, 1920.

Application filed October 20, 1919. Serial No. 331,877.

*To all whom it may concern:*

Be it known that I, HOWARD L. INGERSOLL, a citizen of the United States, residing at White Plains, New York, have invented a certain new and useful Improvement in Governor Controls for Booster-Motors for Locomotives, of which the following is a full, clear, and exact description, such as will enable others skilled in the art to which it appertains to make and use the same, reference being had to the accompanying drawings, forming part of this specification, in which—

Fig. 2 is a diagrammatic view of my governor control employed with the air system supply in connection with booster motors.

Fig. 3 is a vertical longitudinal sectional view showing my governor control in position, and Fig. 4 is a detail sectional view of the governor mechanism.

Figure 1:
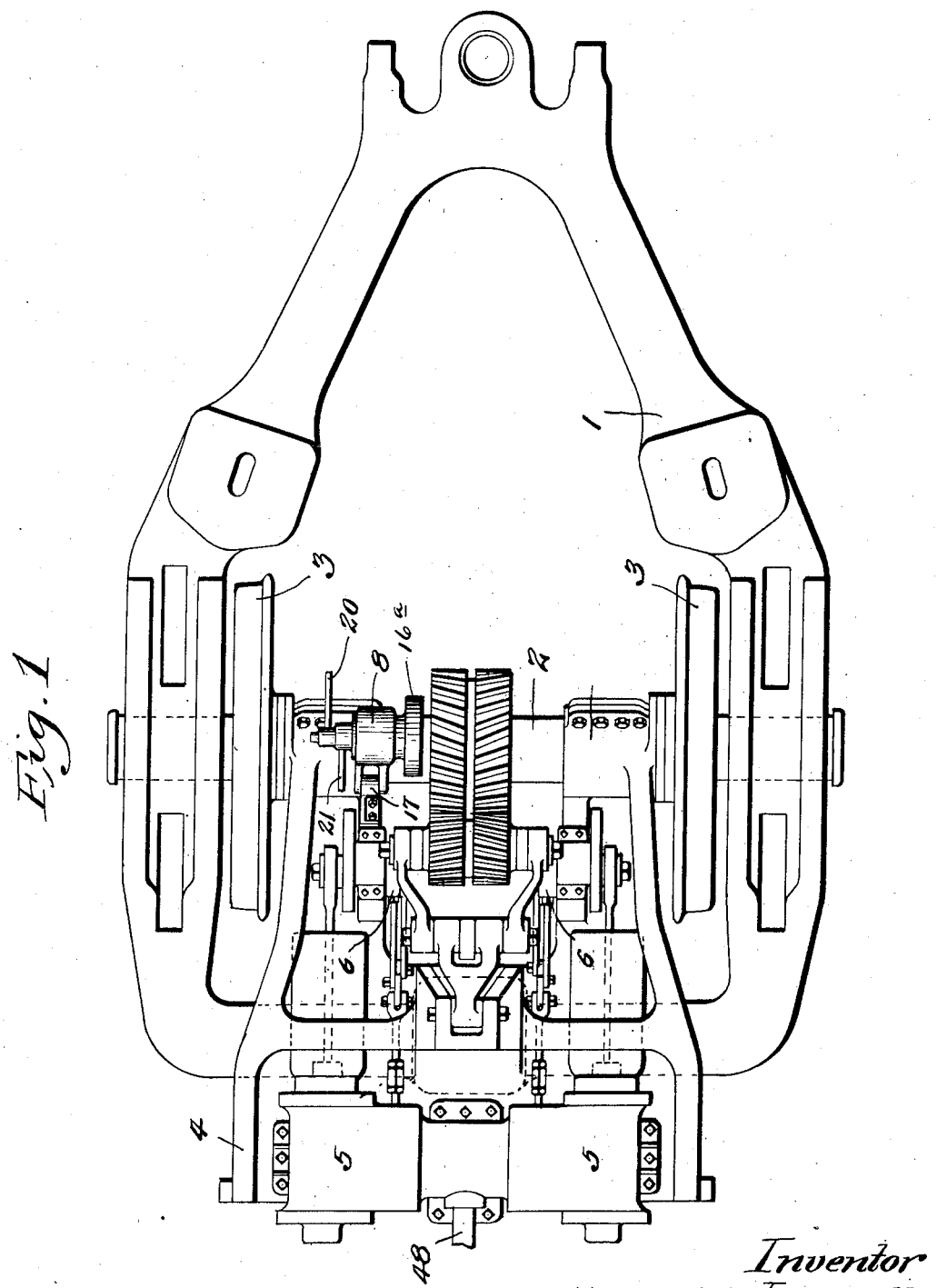
Figure 1 is a top plan view of my improved governor control for booster motors for locomotives.

This invention relates to a new and useful improvement in governors for booster motors for locomotives, the object being to cut out the controlling system for the booster motor when the locomotive attains speed, and permit the booster motor to be "cut in" when the main locomotive is operating at a slow speed or is standing still.

My improved governor is designed to control an air pressure system in control of the booster motor and, therefore, preferably operates a valve which controls said air controlling system.

In the drawings, 1 indicates the frame of a trailer truck, and 2, the axle which carries the supporting wheels 3 thereof. 4 is the frame of the booster motor which is journaled in the axle 2 and which booster motor is provided with cylinders 5 having a valve mechanism 6 interposed therebetween and which may be controlled by any desired form of reversible valve mechanism.

In an application filed by me on the 6th day of June, 1919, Serial No. 302,321, I have shown and described a booster motor controlling system substantially the same as that represented in Fig. 2, in which A. indicates the valve mechanism operated by a moving part of the mechanism which controls the main operating mechanism of the locomotive, in this instance the reverse lever 28. When the reverse lever is thrown forward or backward to its full position, the operator moving the dogs out of the path of the pin, said lever will come in contact with the plunger for operating the mechanism of valve A., thereby establishing communication between an air reservoir 53 and a chamber 7 in a valve casing 8. This chamber 7 contains a valve 9 which is held between two springs, the major of which springs, 10, bears upon a spring follower 11 which coöperates with centrifugal weights 12. The inner ends of these weights 12 operate upon a plunger 13 which coöperates with valve 9 through the medium of a packed piston head 14 carrying a stem 15 having a thrust bearing in the cup-shaped end of plunger 13, which plunger is slidingly carried by the inner end of the hollow shaft 16 operating in ball bearings in casing 5. Centrifugally operated weights 12 are pivoted to the inner end of hollow shaft 16 and their inner ends bear against and normally tend to hold the valve 9 open through the energy exerted upon these centrifugally operated weights by means of the major spring 10 which is located in the hollow shaft 16.

Casing 8 is pivotally mounted on a bracket 17 secured to the frame which carries the booster motor. Said casing is drawn toward the axle 2 by means of a spring 17ª to maintain driving connection between disk 16ª, fixed on one end of hollow shaft 16, and driven axle 2.

A spring 18 located in chamber 7 bears against valve 9 and tends to seat it and close communication between chamber 7 and chamber 19, but is, under normal conditions. *i. e.*, when the locomotive is at a standstill or running below a predetermined speed, overcome by major spring 10. When the locomotive reaches a predetermined speed, the centrifugally operated weights 12 will swing on their pivots moving away from the axis of their rotation, and in doing so will compress spring 10 and allow spring 18 to seat valve 9, thereby closing communication between pipe 20, leading from an air reservoir 53 to chamber 7, and pipe 21, leading from chamber 19 in valve casing 8 to the air pressure controlling valve "A." The tension of major spring 10 can be regulated by means of an adjustable screw 22 located in one end of the hollow shaft 16 and bearing against spring follower 24.

Thus it will be seen that in the present instance, the air pressure system for controlling booster motors is under control of valve "A." which is operated by mechanism controlling the main operating mechanism of the locomotive, and said air pressure system is also controlled by the speed of the locomotive through the medium of centrifugally operated devices actuated by driven axle 2 and coöperating with valve 9.

By adjusting spring 10, the time of operation of valve 9 with relation to the speed of the locomotive, may be controlled, i. e., the air system which is in control of the booster may be cut out when the locomotive is running at a low speed, say eight miles an hour, or by varying the compression on said spring, the operation of valve 9 may be timed, at different speeds, either higher or lower than that mentioned.

It will be observed that the governing mechanism, as an entirety, is readily assembled and dismantled, and when in position has no positive driving connection with a moving part of the locomotive, depending for its operation upon the friction drive (from axle 2) of its wheel 16ᵃ, which latter is preferably faced with fiber, leather, or some other suitable material.

When valve 9 is unseated, as it is when the locomotive is at a standstill, or running at a low speed, the air pressure from reservoir 53 is admitted to pipe 21, one branch of which, 25, goes to valve mechanism A., and the other, 26, to a chamber in the upper end of valve mechanism D. setting a valve 27. When the reverse lever 28 is operated by being thrown to its full forward or rearward position, the engineer operating the foot treadle 30 and displacing the dogs 31 out of the path of movement of a pin 32 on the reverse lever to permit this, the valve mechanism A. will be operated to establish air pressure communication between pipe 25 and a pipe 33, which latter has two branches, one entering the chamber under valve 27, so that when said valve is unseated, as it is by the pressure from pipe 26, the pressure from pipe 33 will enter a pipe 34 leading to a chamber under a piston 35 in valve mechanism B., the rod of which piston operates the clutch for connecting and disconnecting the booster motor from axle 2. The other branch 33ᵃ of pipe 33, leads to a chamber behind a piston 36 in valve mechanism C. and by the presence of pressure behind this piston, it is moved (and held) to the right, as shown in the drawings (Fig. 2).

It will be observed that valve 27 is "set" when the valve 9 is unseated; and that when a part of the controlling mechanism of the main locomotive operates valve mechanism A., the clutch mechanism is operated by piston 35, and piston 36, whose righthand end, as shown, is in reality a valve, is also set.

When the throttle lever of the locomotive (not shown) but which is usually located in the cabin, is operated to lift the valve 37 by means of rod 38 and suitable connections to said valve, steam from the dome 39, of the boiler, is admitted to the dry steam pipe 40, which leads to the main cylinders of the locomotive. The pressure of steam in the dry pipe enters a pipe 41 and moves piston 42 (of valve mechanism C.) leftwardly, thus closing an exhaust port controlled by valve 43, and moving a connected valve 43ᵃ to open communication between pipes 44 and 45. Pipe 44 leads from the upper end of the chamber in which the clutch operating piston 35 is located, and said piston must first be raised and the clutch positioned before pressure is admitted to pipe 44. Upon the establishment of pressure communication between pipes 44 and 45, a piston 46 in valve mechanism D. is depressed, operating, by suitable connections, the throttle valve 47, located in the dry steam pipe 48 leading from the steam dome 39 to the valve chest 5 of the booster motor, which having been previously connected by its clutch mechanism to the axle 2, now becomes an active and potent element in the driving mechanism of the locomotive. When the locomotive attains a predetermined speed, the governing mechanism operates to close valve 9, whereupon the clutch mechanism disconnects the booster motor from axle 2, and the throttle valve 47 is closed. Valve 27 is permitted to take its seat. When the reverse lever is "hooked up", i. e. retracted a notch or two from its extreme starting position, in which latter, or starting position, full pressure is admitted throughout the full stroke of the pistons in the main cylinders of the locomotive, whereas, by the "hooking up" of the reverse lever the supply of steam is cut off short of the full stroke of the pistons in the main cylinders of the locomotive, and said pistons are thus operated partly by expansion of the steam, depending upon the extent of the "hooking up" of the reverse lever incident to the speed of the locomotive, the valve mechanism A. operates to open an exhaust port *a* to "bleed" or exhaust the air controlling system of the booster motor. Thus, it will be seen that there are two means of controlling the supply of air to the air system in control of the booster motor, one, the governing mechanism automatically operated to cut out the booster motor at a predetermined speed of the locomotive and the other, a moving part of the controlling mechanism for the main locomotive, in this instance, the reverse lever, which, in the usual operation of locomotives, is thrown to either extreme position in starting, in which position the booster motor may be cut in, if the engineer so desires, and depresses the foot treadle to accomplish such a result, and if cut in, the "hooking up" of the reverse lever by the engineer will cut out the booster motor. This "hooking up" is done at the will of the engineer and may be effected before or after the governing mechanism becomes effective to cut out the booster motor.

I claim:

1. In a governing mechanism for booster motors for locomotives, the combination of a booster motor, an air system in control thereof, and means operated by the speed of a moving part of the locomotive for rendering said air system effective or ineffective.

2. In a governing mechanism for booster motors for locomotives, the combination of a booster motor, an air system in control thereof, and means operated by a moving part of the locomotive for rendering said air system ineffective at a predetermined speed of the locomotive.

3. In a governing mechanism for booster motors for locomotives, the combination of a booster motor, an air system in control thereof and in communication with a source of air supply when the locomotive is at a standstill or running at a low speed, and means operated by a moving part of the locomotive for closing communication between said air system and its source of supply when the locomotive attains a predetermined high speed.

4. In a controlling system for booster motors for locomotives, the combination of a booster motor, an air pressure system in control thereof, and dual means for controlling the pressure in said air system, one being operable in accordance with the speed of the locomotive and the other at the will of the engineer.

5. In a controlling system for booster motors for locomotives, the combination of a booster motor, an air pressure system in control thereof, means for controlling the main locomotive, said means including a moving part for rendering said air pressure system effective to cut in and cut out said booster motor, and means operated in accordance with the speed of the locomotive for cutting out said booster motor.

6. In a governing mechanism for booster motors, the combination of a valve under control of the moving part of the controlling mechanism of the main locomotive and an interposed valve in control of said first-mentioned valve, said interposed valve being operated in accordance with the speed of the locomotive.

7. In a governing mechanism for booster motors for locomotives, the combination of a valve operable by a moving part in the controlling mechanism for the main locomotive, said valve admitting and exhausting air pressure to the controlling mechanism for the booster motor, and a valve interposed between said controlling valve and the source of air pressure supply, said last-mentioned valve being rendered effective or ineffective in accordance with the speed of the locomotive.

8. In a governing mechanism for booster motors for locomotives, the combination of a valve operable by a moving part in the controlling mechanism for the main locomotive, said valve admitting and exhausting air pressure to the controlling mechanism of the booster motor, a valve interposed between said controlling valve and the source of air pressure supply, and means actuated in accordance with the speed of the locomotive for controlling the last-mentioned valve.

9. In a governing mechanism for booster motors for locomotives, the combination of the controlling mechanism of the locomotive, of a booster motor, an air pressure system controlling said booster motor, a valve in control of said air pressure system, and means actuated in accordance with the speed of the locomotive for operating said valve.

10. In a governing mechanism for booster motors for locomotives, the combination of a booster motor, an air pressure system controlling said booster motor, a valve in control of said air pressure system, and centrifugally operated means actuated by the speed of the locomotive and coöperating with said valve, whereby the operation of the valve is conditioned upon the speed of the locomotive.

11. In a governing mechanism for booster motors for locomotives, the combination of the controlling devices of the locomotive, a booster motor, an air pressure mechanism controlling said booster motor and under control of the controlling mechanism of the locomotive, an air pressure supply for said mechanism, a valve controlling the air pressure supply and normally held open, and centrifugally operated devices actuated by the speed of the locomotive and designed to close said valve when the locomotive reaches a predetermined speed.

12. In a governing mechanism for booster motors, for locomotives, the combination of a booster motor, an air pressure system controlling said booster motor, a valve controlling said air pressure system, a rotary member actuated by the speed of the locomotive, and centrifugally operated devices carried by said rotary member and in operative engagement with said valve.

13. In a governing mechanism for booster motors for locomotives, the combination of a valve operable by a moving part of the controlling mechanism of the main locomotive, said valve admitting and exhausting air pressure for the controlling mechanism for the booster motor, a valve interposed between said controlling valve and a source of air pressure supply, a rotary member actuated by the speed of the locomotive, and centrifugally operated arms pivotally mounted on said rotary member and in operable engagement with the last-mentioned valve, whereby said valve is seated, shutting off the air pressure supply to the booster motor controlling mechanism, when the locomotive attains a predetermined speed; and unseated, restoring communication between the air pressure supply and the controlling mechanism of the booster motor, when the speed of the locomotive falls below a predetermined speed.

14. In a governing mechanism for booster motors for locomotives, the combination of a booster motor, an air pressure system controlling said booster motor, a booster motor bed-plate, a driven axle supporting said bed-plate, a casing supported on said booster motor bed-plate, a rotatable member journaled in said casing and actuated by the driven axle, centrifugally operated elements carried by said rotatable member, a valve controlling the air pressure system, a minor spring tending to seat said valve, and a stronger spring opposing said minor spring and coöperating with the centrifugally operated elements in holding the valve open and designed to be actuated by said centrifugally operated elements so as to permit the minor spring to seat the valve when the locomotive reaches a predetermined speed.

15. In a governing mechanism for booster motors for locomotives, the combination of a booster motor, an air pressure system controlling said booster motor, a booster motor bed-plate, a driven axle supporting said bed-plate, a rotatable member journaled in said casing and actuated by the driven axle, centrifugally operated elements carried by said rotatable member, a valve controlling the air pressure system, a minor spring tending to seat said valve, a stronger spring opposing said minor spring and coöperating with the centrifugally operated elements in holding the valve open and designed to be actuated by said centrifugally operated elements so as to permit the minor spring to seat the valve when the locomotive reaches a predetermined speed, and adjustable means for regulating the tension of the stronger spring.

16. In a governing mechanism for booster motors for locomotives, the combination of a booster motor, an air pressure system controlling said booster motor, a booster motor bed-plate, a driven axle supporting said bed-plate, a casing supported on said booster motor bed-plate, a rotary member journaled in said casing and actuated by the driven axle, centrifugally operated elements carried by said rotary member, a valve controlling the air pressure system, a minor spring tending to seat said valve, a stronger spring opposing said minor spring and coöperating with the centrifugally operated elements in holding the valve open and designed to be actuated by said centrifugally operated elements so as to permit said minor spring to seat the valve when the locomotive reaches a predetermined speed, and means for maintaining said rotary member in operative engagement with said driven axle.

17. In combination with the main driving mechanism of a locomotive, and its controlling devices, of a booster motor, means for establishing a driving connection between the booster motor and the locomotive and thereafter supplying the booster motor with motive fluid, and means actuated when the locomotive reaches a given speed for first cutting off the motive fluid from the booster motor and thereafter disconnecting the same from the locomotive.

18. In combination with the main driving mechanism of a locomotive and its reverse lever and throttle valve; of a booster motor, means actuated by the movement of the reverse lever to an extreme position and by the opening of the throttle valve for causing said booster motor to apply driving force to the locomotive, and means actuated when the locomotive reaches a given speed for making said booster motor ineffective.

19. In combination with the main driving mechanism of a locomotive and its reverse lever and throttle valve; of a booster motor, means actuated by the movement of the reverse lever to an extreme position and by the opening of the throttle valve for first establishing a driving connection between the booster motor and the locomotive and thereafter supplying the booster motor with motive fluid, and means actuated when the locomotive reaches a given speed for first cutting off motive fluid from the booster motor and thereafter disconnecting the same from the locomotive.

20. In combination with the main driving mechanism of a locomotive and its reverse lever and throttle valve; of a booster motor having a motive fluid supply pipe and throttle lever and a clutch mechanism adapted to engage the motor with an axle of the locomotive; an air pressure system for operating the clutch mechanism and the booster motor throttle valve which becomes effective, when the reverse lever and locomotive throttle are operated, to first clutch the booster motor to said axle and thereafter admit motive fluid to the booster motor; and a device which is actuated when the locomotive reaches a given speed to cut off the supply of motive fluid from the booster motor and disconnect the same from said axle.

21. In combination with the main driving means of a steam propelled locomotive, a booster motor for aiding the main driving means in starting the locomotive and propelling the same at low speeds, and means for controlling the booster motor comprising a device which operates to put the booster motor out of action when the locomotive exceeds a certain speed.

22. In combination with the main driving means of a steam propelled locomotive, a steam operated booster motor, mechanism providing a disengageable driving connection between the booster motor and the locomotive, mechanism for controlling a supply of steam to the booster motor, and controlling means for the aforesaid mechanism which operates to cause steam to be shut off from the booster motor and the motor disengaged from the locomotive when the locomotive exceeds a given speed.

23. In combination with the main driving means of a steam propelled locomotive and its controlling device, a booster motor for aiding the main driving means in starting the locomotive and propelling the same at low speeds, and means for controlling the booster motor through the manipulation of the controlling devices of the main driving means comprising means actuated when the locomotive exceeds a given speed for putting the booster motor out of action.

24. In combination with the main driving means of a steam propelled locomotive and its controlling device, a booster motor for aiding the main driving means in starting the locomotive and propelling the same at low speeds, and means for controlling the booster motor through the manipulation of the controlling devices of the main driving means comprising means actuated by the presence of pressure in the main driving means for putting the booster motor out of action.

25. In combination with the main driving means of a steam propelled locomotive and its throttle valve and reverse lever, a booster motor to aid the main driving means in starting the locomotive and propelling the same at low speeds, means for establishing and disestablishing a driving connection between the booster motor and the locomotive comprising the fluid pressure actuated device B, means for operating the booster motor throttle comprising the fluid pressure operated device D and its pilot valve, the valve mechanism C, the valve A operated through the movement of the reverse lever, and the governing device interposed between the source of supply of fluid pressure and valve A and the fluid pressure device D, substantially as described.

26. In combination with the main driving means of a locomotive, a booster motor for aiding the main driving means for starting the locomotive and propelling the same at low speeds, and controlling mechanism for the booster motor comprising means whereby the booster is incapable of driving the locomotive at speeds of the locomotive above a predetermined speed.

27. In combination with the main driving means of a steam propelled locomotive, a steam operated booster motor, mechanism providing a disengageable connection between the booster motor and the locomotive, mechanism for controlling the supply of steam to the booster motor, and means which at speeds of the locomotive above a predetermined speed prevents the connection of the booster with the locomotive and the supply of steam thereto.

In testimony whereof I hereunto affix my signature this 16th day of October, 1919.

HOWARD L. INGERSOLL.